US006111600A

United States Patent [19]

McLeod et al.

[11] Patent Number: 6,111,600

[45] Date of Patent: Aug. 29, 2000

[54] EXTENDED-REACH SEWER INSPECTION DEVICE

[76] Inventors: James F. McLeod; Thomas A. Johnson, both of 6424 Greenridge Dr., Racine, Wis. 53406

[21] Appl. No.: 09/041,358

[22] Filed: Feb. 26, 1998

[51] Int. Cl.[7] .......... H04N 7/18

[52] U.S. Cl. .......... 348/84

[58] Field of Search .......... 348/84; 73/865.8; H04N 7/18

[56] References Cited

U.S. PATENT DOCUMENTS

| | | | |
|---|---|---|---|
| 3,715,484 | 2/1973 | Latall | 348/84 |
| 3,885,091 | 5/1975 | Fish et al. | 348/84 |
| 4,107,738 | 8/1978 | Van Norman | 348/84 |
| 4,675,728 | 6/1987 | Egger et al. | 348/84 |
| 5,084,764 | 1/1992 | Day | 348/84 |
| 5,195,392 | 3/1993 | Moore et al. | 348/84 |
| 5,754,220 | 5/1998 | Smalser | 348/84 |
| 5,892,163 | 4/1999 | Johnson | 73/865.8 |
| 5,904,210 | 5/1999 | Stump et al. | 175/45 |
| 5,907,242 | 5/1999 | Gard | 324/335 X |
| 5,996,159 | 12/1999 | Irwin | 348/84 |

OTHER PUBLICATIONS

Sreco Flexible, Inc. product brochure entitled "Mini Camera Systems and Accessories . .".

*Primary Examiner*—Howard Britton
*Attorney, Agent, or Firm*—Jansson, Shupe, Bridge & Munger, Ltd.

[57] ABSTRACT

An extended-reach sewer inspection device involving a hose-driven apparatus for progressively inspecting and cleaning the inside of a pipe at remote locations. The apparatus is comprised of a hose that has a nozzle apparatus which includes rearwardly-directed non-axial orifices such nozzle is attached to a forwardly-extending axially-aligned male member that has a female proximal end connected to the hose and a distal end opposite of the hose. A skid that includes a central body with at least three pipe-engaging runners connected to it and an axially-aligned opening dimensioned to freely receive the male member in such a manner as to allow the member to rotate freely within the skid. A retainer is secured to the distal end of the male member to hold it in the central-body opening, and a video camera is affixed to the central body whereby non-rotating video images are available to assist in the inspection and cleaning of a pipe.

7 Claims, 7 Drawing Sheets

EXTENDED-REACH SEWER INSPECTION DEVICE

FIELD OF THE INVENTION

This invention relates generally to an apparatus for inspecting pipeline systems and, more particularly, to a sewer pipe inspection device that employs a mini-camera system.

BACKGROUND OF THE INVENTION

The use of a mini-camera attached to the end of a push rod or mounted on a some type of platform in order to view blockage or damage in a section of pipe beneath the surface of the ground is well known in the art. Such cameras are propelled through the pipe by means of a push rod or by the use of a motor powered carriage. While useful in helping to view the pipe's interior, such known devices are limited in that they do not always provide a stable camera platform, nor do they allow for the pipe to be cleaned while viewing its interior.

Although the mini-camera mounted to the end of a push rod is capable of traversing the bends and turns of a pipe system it is not stabilized and therefore rotates along with the push rod as the rod is pulled from it containing reel. Such rotation makes it difficult for the observer to evaluate the video as one must continually reorient themselves as to where the top and bottom of the pipe is. This is because what appears on the screen is based on the position of the camera which may have rotated to the inverted position. A device that would allow for the stabilization of a mini-camera as it is propelled down a pipe line would be a major improvement in the art.

Another known device for propelling a camera through a pipe involves the use of a sewer flushing machine that utilizes water to push the camera through the pipe. This allows the pipe to be cleaned and inspected at the same time. Such device also generates a water flow which, when seen on the television monitor, provides a reference point for the viewer as to where the bottom of the tank is. While it is advantageous to clean the pipe while at the same time having a viewing reference point to aid in the pipe inspection, it would be even more beneficial if one could prevent the camera from rotating along with the water hose as it travels through the pipeline. Not only would such improvement benefit the observer watching the television monitor, but it would also prevent the camera from rolling underwater as it transits the pipeline.

An improved camera support that is capable of being propelled with a jet stream of water while at the same time stabilizing the camera and thus overcoming some of the problems and shortcomings mentioned above would be an important advance in the art.

OBJECTS OF THE INVENTION

It is an object of the invention to provide an improved apparatus for inserting a camera into a pipeline that overcomes some of the problems and shortcomings of the prior art.

Another object of the invention is to provide an improved apparatus for inserting a camera into a pipeline that stabilizes the camera during its transit through the pipe.

Another object of the invention is to provide an improved apparatus for inserting a camera into a pipeline that allows for the cleaning of the pipeline at the same time it is being inspected.

Still another object of the invention is to provide an improved apparatus for inserting a camera into a pipeline that prevents the camera from rolling underwater as it transits the pipeline.

How these and other objects are accomplished will become apparent from the following descriptions and from the drawings.

SUMMARY OF THE INVENTION

This invention involves a hose-driven apparatus for progressively inspecting and cleaning the inside of a pipe at remote locations. The apparatus is comprised of: (1) a hose that has a nozzle member which includes rearwardly-directed non-axial orifices wherein such nozzle is attached to a forwardly-extending axially-aligned male member that has a proximal end connected to the nozzle member and a distal end opposite of the nozzle member; (2) a skid that includes a central body with at least three pipe-engaging runners connected to it and an axially-aligned opening dimensioned to freely receive the male member in such a manner as to allow the member to rotate freely within the skid; (3) a retainer, secured to the distal end of the male member in order to hold it in the central-body opening; and (4) a video camera affixed to the central body whereby non-rotating video images are available to assist in the inspection and cleaning of a pipe.

In one embodiment of the invention, the video camera attached to the hose-driven apparatus is off-set from the axially-aligned opening of the central body. In such embodiment, a coaxial cable is attached to both the video camera and the skid.

In a more preferred embodiment of the invention, the forwardly-extending axially-aligned male member is made of stainless steel. In another version of such embodiment, the forwardly-extending axially-aligned male member is machined so as to fit flush within the axially-aligned opening of the central body.

In still another embodiment of the invention, a drag line is connected to the skid opposite of the hose.

In still another embodiment of the invention, a transmitter sonde is attached to the skid. Such transmitter allows the apparatus to be located in the pipeline.

Other aspects of the invention are set forth in the following detailed description and in the drawings.

FIG. **5*a*** is a perspective view of one version of a nozzle member employed with the hose-driven apparatus.

FIG. **5*b*** is a sectional view of the nozzle employed with the hose-driven apparatus.

Figure 6:
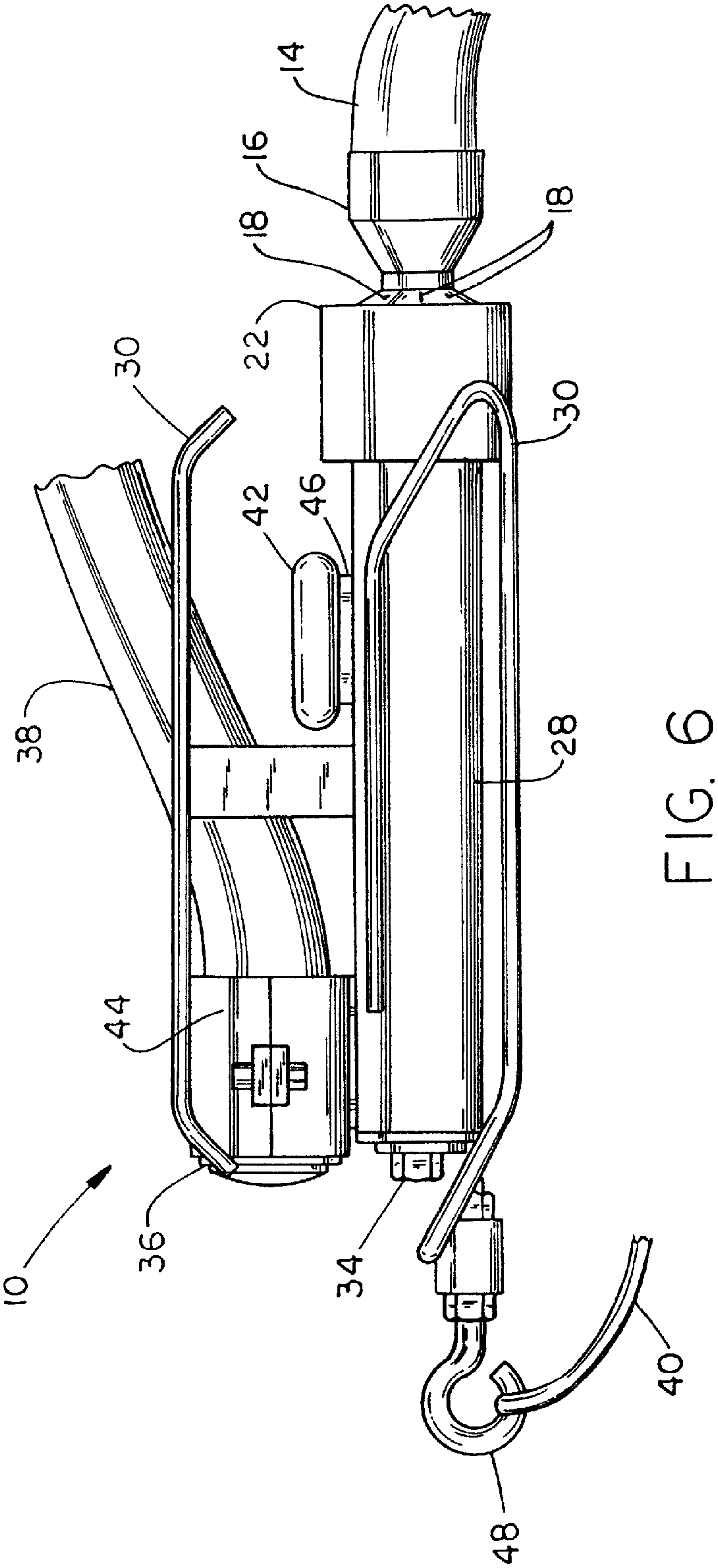

FIG. 6 is a side view of the hose-driven apparatus showing a camera mounted in the camera hold-down bracket and a transmitter sonde positioned on the cable hold-down bracket.

Figure 7:
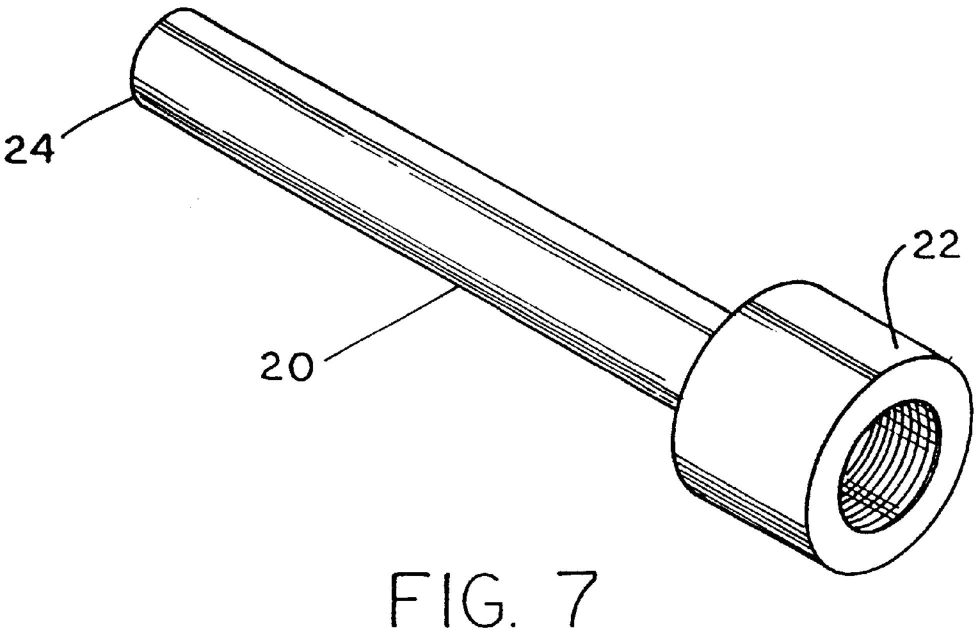

FIG. 7 is a perspective view of the forwardly-extending axially-aligned male member.

Figure 8:
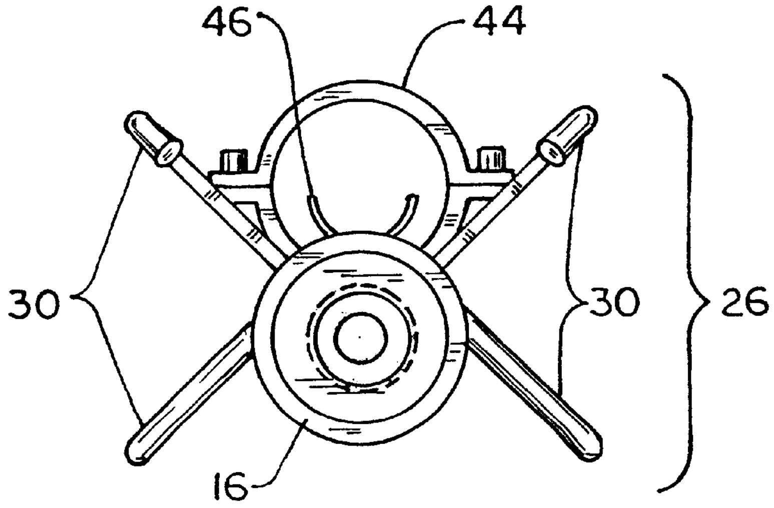

FIG. 8 is a rear view of the hose-driven apparatus.

DETAILED DESCRIPTION OF PREFERRED EMBODIMENTS

Cameras attached to the end of a push rod or some other type of probe are often used to allow for visual inspection of the inner surfaces of pipelines and other arterial type fluid systems. Such cameras while very useful have at times made it difficult for the operator to correctly diagnose a problem in that the camera is unable to maintain a proper orientation with regard to a given reference point while it transits the pipeline.

Figure 1:
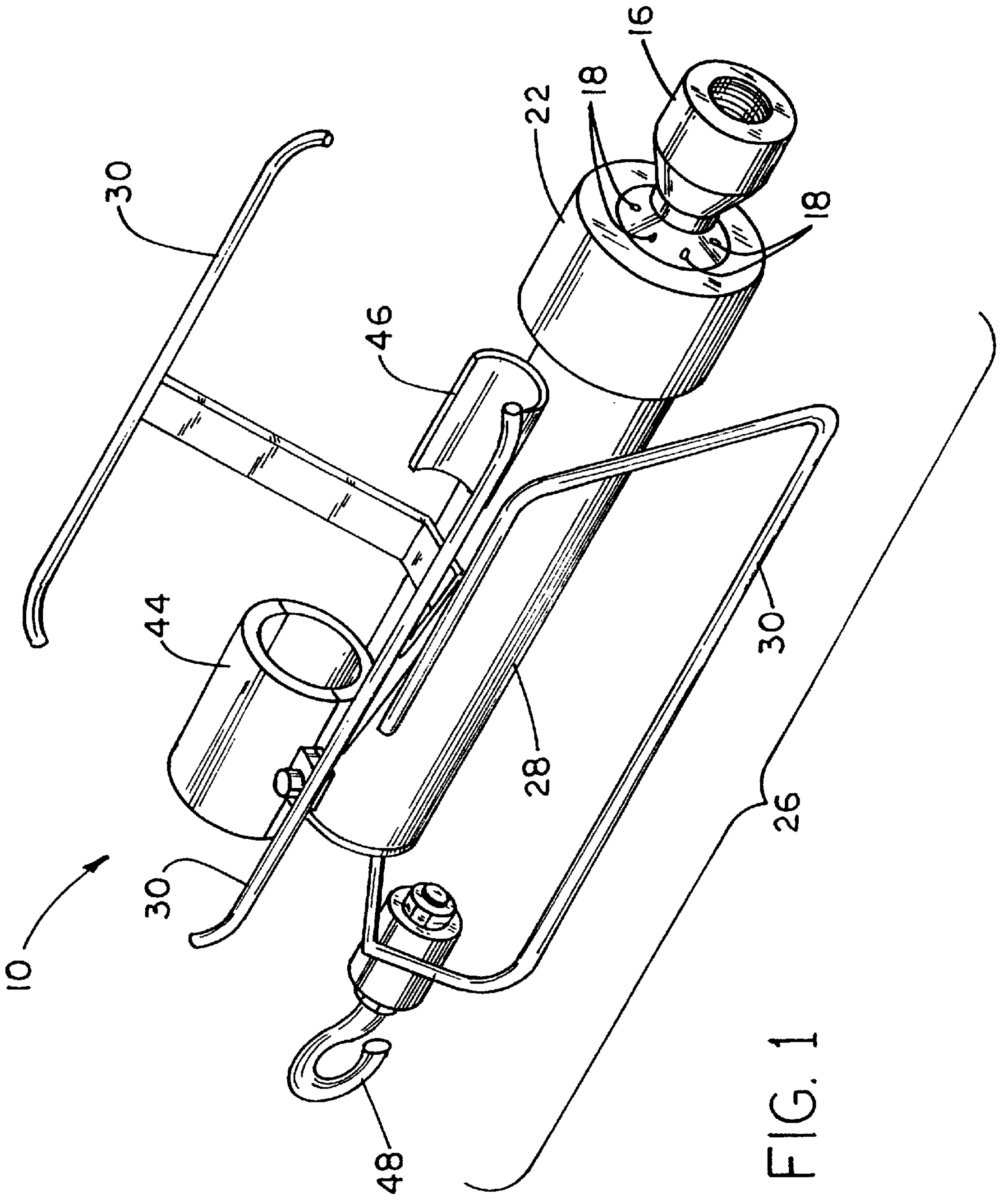
FIG. 1 is a perspective view of the hose-driven apparatus showing the nozzle connected to the central body of the skid and the camera and cable hold-down brackets attached to the top of the skid.
Figure 2:
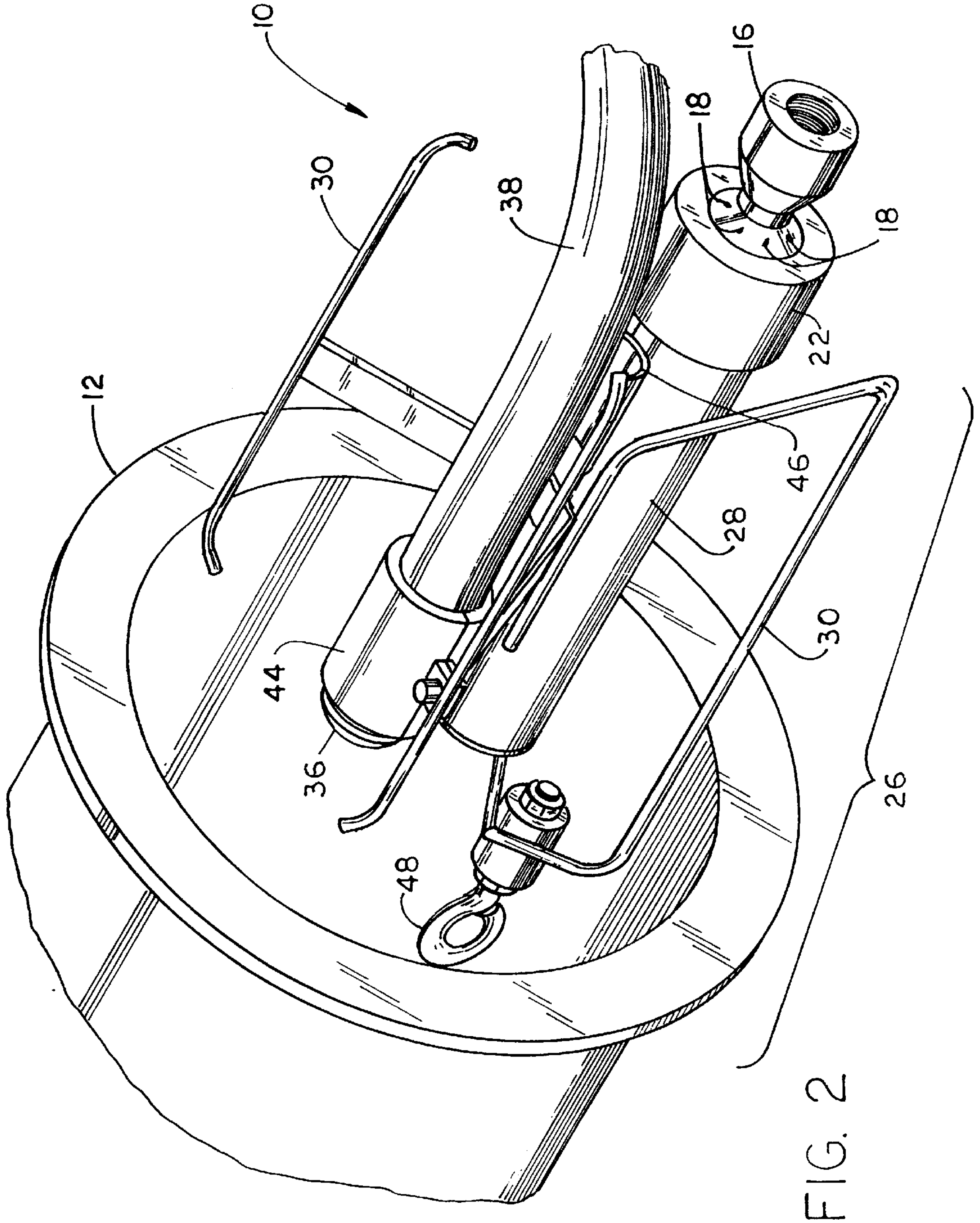
FIG. 2 is a perspective view of the hose-driven apparatus showing the apparatus entering a pipeline with a camera and coaxial cable mounted on top of the central body of the skid.
Figure 3:
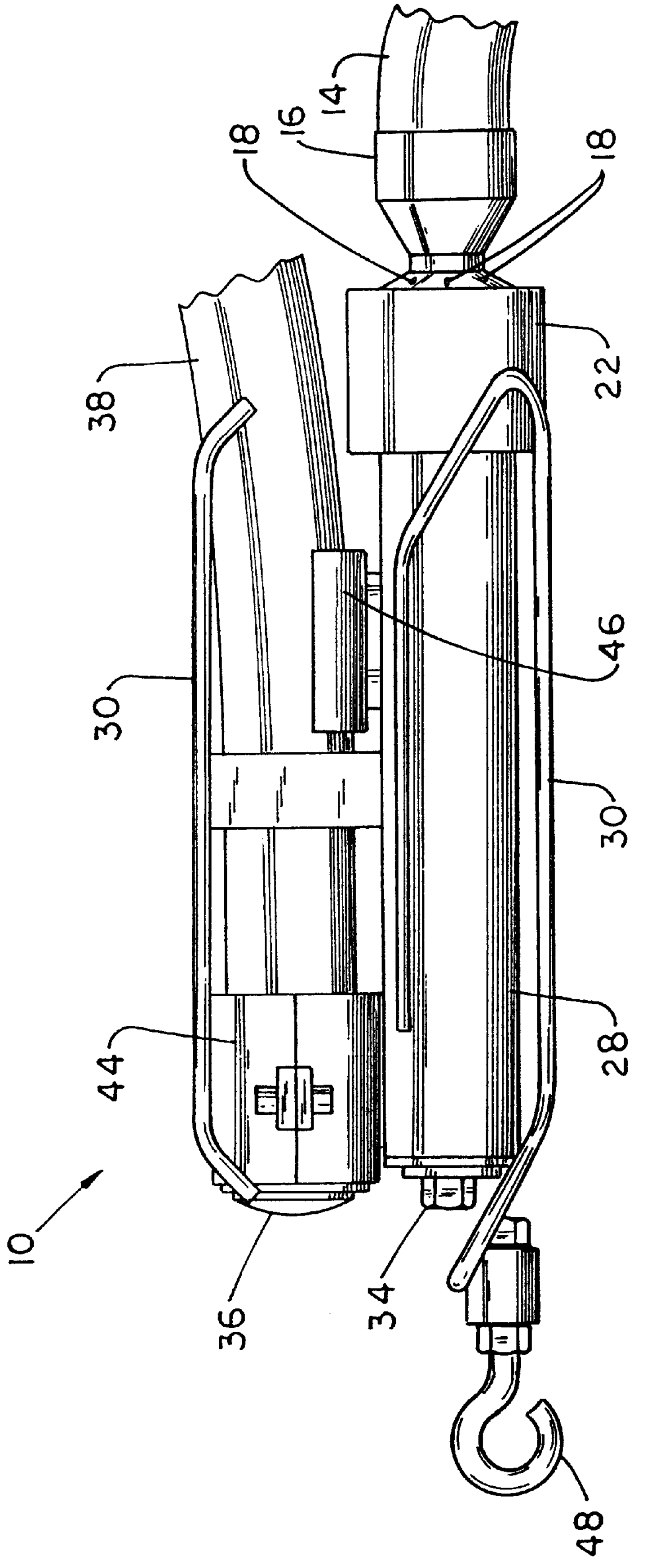
FIG. 3 is a side view of the hose-driven apparatus.

FIG. 1 shows the invention which allows a camera to be propelled through a pipeline while remaining stabilized with respect to the bottom of the pipe. The invention involves a hose-driven apparatus 10 for progressively inspecting and cleaning the inside of a pipe 12 at remote locations. The apparatus 10, as shown in FIGS. 2 and 3, is comprised of a hose 14 that has a nozzle member 16 which includes rearwardly-directed non-axial orifices 18. Such nozzle 16 is attached to a forwardly-extending axially-aligned male member 20 that has a proximal end 22 connected to the nozzle member 16 and a distal end 24 opposite of the nozzle member 16. A skid 26 that includes a central body 28 with at least three pipe-engaging runners 30 connected to it has an axially-aligned opening 32 that is dimensioned so as to freely receive the male member 20 in such a manner as to allow for the member 20 to rotate freely within the skid 26. A retainer 34 is secured to the distal end 24 of the male member 20 to hold it in the central-body opening 32, and a video camera 36 is affixed to the central body 28 whereby non-rotating video images are available to assist in the inspection and cleaning of a pipe 12.

Figure 4:
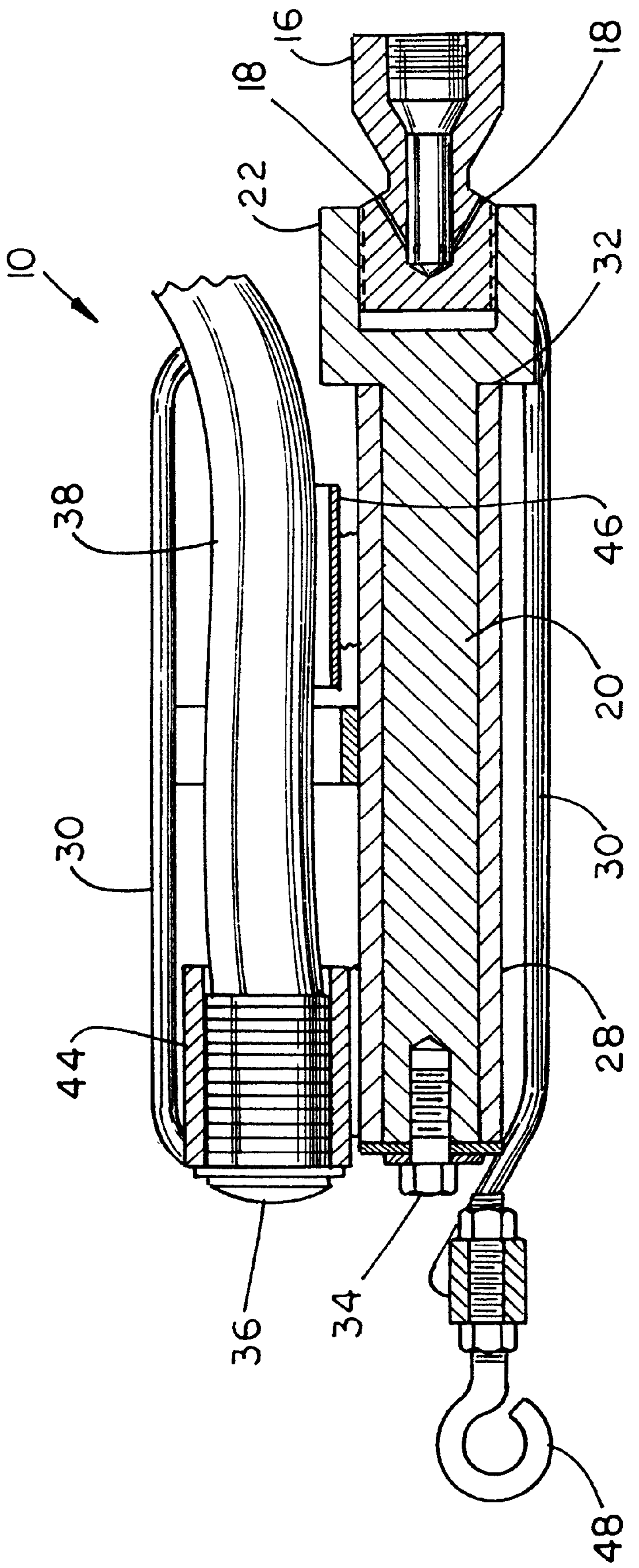
FIG. 4 is a sectional view of the hose-driven apparatus as shown in FIG. 3.

FIG. 4 is a sectional view of the apparatus 10 showing the camera 36 secured in the camera hold-down bracket 44 and the coaxial cable 38 positioned in the cable hold-down bracket 46. Also shown in FIG. 4 is the drag line hook 48 and the retainer 34. Such retainer 34 is used to secure the distal end 24 of the forwardly-extending axially-aligned male member 20.

In a particular embodiment of the invention, as shown in FIG. 4, the retainer 34 involves a hole drilled and tapped into the distal end 24 of the male member 20 so as to accept retainer bolt 34.

Figure 5B:
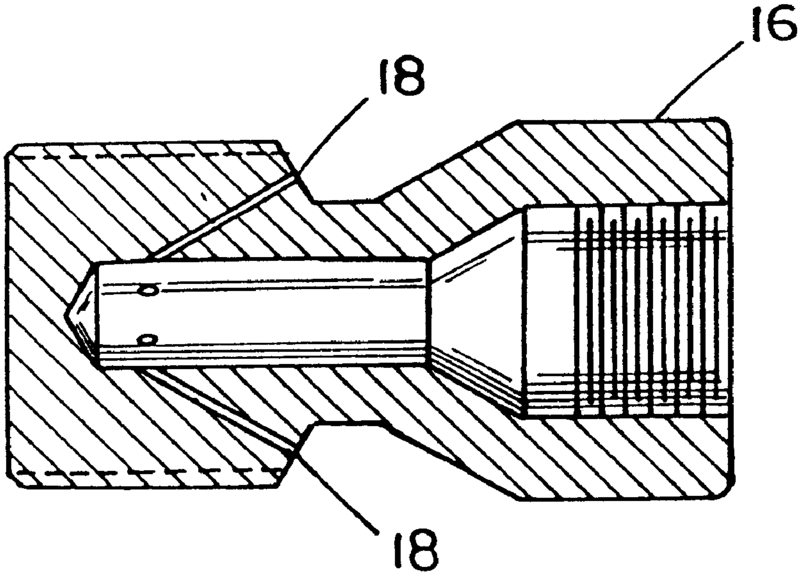
Figure 5A:
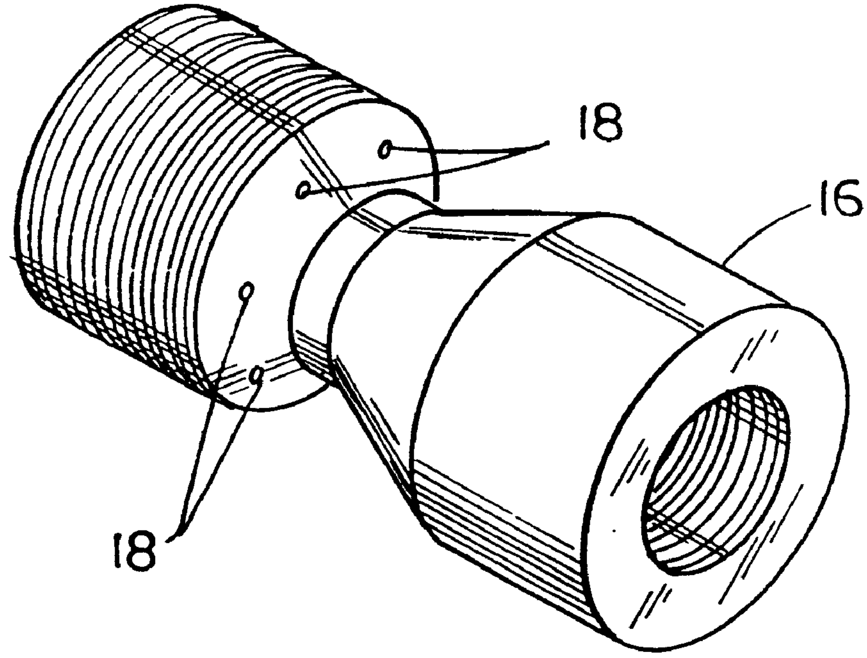

FIG. 5*a* shows an example of the nozzle 16 and its rearwardly-directed non-axial orifices 18 used with the invention. Such orifices 18 allow a jet stream of water to escape from the rear of the skid 26 thereby propelling the skid 26 forward into the pipe 12. FIG. 5*b* is a sectional view of such nozzle 16. While the nozzle 16 shown has a circular end, it is understood that various embodiments of the invention could employ nozzles 16 utilizing ends that may be tapered or shaped in other ways. FIG. 8 shows the rear view of the nozzle 16 as it is connected with the skid.

In one embodiment of the invention, as shown in FIGS. 2, 3, 5, and 6, a camera hold-down bracket 44 allows the video camera 36 attached to the hose-driven apparatus 10 to be off-set from the axially-aligned opening 32 of the central body 28. In another version of such embodiment, a coaxial cable 38 is attached to a cable hold-down bracket 46 positioned behind the camera 36.

FIG. 7 shows the forwardly-extending axially-aligned male member 20. In a more preferred embodiment of the invention, such member 20 is made of stainless steel. The stainless steel adds weight to the member 20 thereby helping to balance the skid 26 as the additional weight helps to prevent pitch-up of the skid 26 thus holding it in contact with the surface of the pipe 12.

In another version of such embodiment, the forwardly-extending axially-aligned male member 20 is machined so as to fit flush within the axially-aligned opening 32 of the central body 28. It is this forwardly-extending axially-aligned male member 20 that is attached to the nozzle 16 of a sewer flushing machine.

Because the male member 20 is allowed to rotate within the center body 28 of the skid 26 independent of the skid 26 itself, the skid maintains its orientation with the bottom surface of the pipe 12 thereby stabilizing the camera 36. This is because the male member 20 absorbs the rotational force generated by the payout of the hose 14 without transferring those forces to the skid 26 and the camera 36 mounted thereon.

FIG. 6 shows yet another embodiment of the invention in which a drag line 40 is connected to the skid 26 opposite of the hose 14. This drag line 40 allows the skid 26 to be pulled through a pipeline 12. Such capability is useful should the camera 36 become stuck in the pipe 12.

In still another embodiment of the invention, as shown in FIG. 6, a transmitter sonde 42 is positioned in the cable hold-down bracket 46 attached to the skid 26. Such transmitter 42 allows the apparatus to be located in the pipeline 12.

While the principles of the invention have been shown and described in connection with specific embodiments, it is to be understood clearly that such embodiments are by way of example and are not limiting.

We claim:

1. A hose-driven apparatus for progressively inspecting and cleaning the inside of a pipe at remote locations comprised of:

a hose having a nozzle member, such nozzle member including rearwardly-directed non-axial orifices;

a forwardly-extending axially-aligned male member having a proximal end connected to the nozzle member and a distal end opposite the nozzle member;

a skid including a central body and at least three pipe-engaging runners connected to the central body, the central body forming an axially-aligned opening dimensioned so as to substantially completely enclose and freely receive the male member to allow for its rotation therein;

a retainer secured to the distal end to hold the male member in its insertion into the central-body opening; and a video camera affixed to the central body;

whereby non-rotating video images are available to assist the inspection and cleaning operation.

2. The hose-driven apparatus of claim 1 wherein the video camera is off-set from the axially-aligned opening.

3. The hose-driven apparatus of claim 1 wherein a coaxial cable is attached to the video camera and the coaxial cable is attached to the skid.

4. The hose-driven apparatus of claim 1 wherein the forwardly-extending axially-aligned male member is made of stainless steel.

5. The hose-driven apparatus of claim 4 wherein the forwardly-extending axially-aligned male member is machined so as to fit flush within the axially-aligned opening of the central body.

6. The hose-driven apparatus of claim 1 wherein a drag line is connected to the skid opposite of the hose.

7. A hose-driven apparatus of claim 1 wherein a transmitter sonde is affixed to the skid.

* * * * *